United States Patent [19]

Jean

[11] Patent Number: 5,115,218

[45] Date of Patent: May 19, 1992

[54] MICROWAVE PROCESS SEAL AND METHOD

[75] Inventor: Buford R. Jean, Round Rock, Tex.

[73] Assignee: Baker Hughes Inc., Houston, Tex.

[21] Appl. No.: 667,589

[22] Filed: Mar. 11, 1991

[51] Int. Cl.⁵ .............................................. H01P 1/08
[52] U.S. Cl. ...................................... 333/252; 333/35
[58] Field of Search ................ 333/252, 251, 248, 33, 333/35, 24 R; 250/505.1, 357.1

[56] References Cited

U.S. PATENT DOCUMENTS 3,594,667 7/1971 Mann ................................. 333/34

Primary Examiner—Eugene R. LaRoche
Assistant Examiner—Ali Neyzari
Attorney, Agent, or Firm—Alton W. Payne; Delmar L. Sroufe

[57] ABSTRACT

A microwave process seal and method is provided for use, for example, in the detection of ullage level and flow in a vessel or conduit by detecting the presence of a solid or liquid material in proximity to a microwave detector. Particularly, a horn design is provided in conjunction with, the microwave process seal of the present invention which fits in the mouth of the horn. The microwave process seal is kept as thin as possible to meet pressure requirements. The surface of the seal is oriented at or near the Brewster angle. The Brewster angle is that angle for which there is total transmission across a dielectric boundary for energy that strikes the boundary with a linear polarization.

4 Claims, 4 Drawing Sheets

MICROWAVE PROCESS SEAL AND METHOD

FIELD OF THE INVENTION

The present invention relates to techniques for detecting when the contents of a tank or other vessel reach a certain level and, more particularly, to improved techniques for determining when that level is obtained utilizing microwave technology having significant advantages compared to conventional level detection techniques. Specifically, the present invention relates to a microwave process seal and an associated method.

BACKGROUND OF THE INVENTION

Various process seals have long been used to secure a tank or other vessel for determining when the level of material in the tank reaches a certain point. Microwave sensors have a significant advantage over other devices in that such devices may be universally employed for detecting the level of almost any solid or liquid, regardless of its conductivity or specific gravity. Moreover, microwave sensors are generally insensitive to dust, vapors, foam layers, or viscous liquid coatings or thin layers of powder on the sides of the vessel.

Several prior patents describing microwave sensing devices are known. For example, U.S. Pat. No. 4,107,993 discloses microwave techniques for detecting the level of a liquid in a vessel. An external chamber constructed of material invisible to microwaves is required, and the system detects amounts of unabsorbed energy to the receiver. Microwave devices of this type experience alignment problems since the transmitter and receiver must be properly positioned with respect to one another. U.S. Pat. Nos. 4,218,678, 4,359,902, and 4,044,355 also disclose microwave sensing devices for determining the level of materials in a tank. Microwave devices which utilize radar technology generally seek to determine the travel time of a signal to the detected material and thence to the receiver. The expense and complexity of these devices limits their practical use to situations in which the actual level of the material in the tank must be determined, as compared to devices which simply determine whether the material has or has not reached a certain level. U.S. Pat. Nos. 3,572,119 and 4,458,530 are similarly directed to devices intended to quantitatively determine the level of liquid in a vessel. A sensor monitors the alteration of the standing wave passing through the liquid to determine the liquid level.

Passing the maximum microwave energy through the process seal is easily accomplished in the absence of condensation or coating build up on the process side of the seal. Numerous references are available that discuss dielectric windows in a lossless, semi-infinite situation. The real problem is to provide a microwave window that minimizes reflection and transmission losses when one surface of the seal is coated with a process material, or when condensation of water occurs on the surface, or when both situations occur.

Additional known patents describe microwave windows. For example, U.S. Pat. No. 3,594,667 describes a microwave window having dielectric variation for the tuning of different resonances. The '667 patent modifies a dielectric window to increase the thickness of the window near the outer periphery and to decrease its thickness at an intermediate radius to lower the frequency of one mode of transmission and to raise the frequency of another mode of transmission. Alternately, the '667 patent describes the variation of the dielectric constant in the window instead of varying the thickness of the window for achieving the same result. U.S. Pat. Nos. 4,566,321 and 4,670,754 describe a plan-convex microwave lens having no air pockets, voids, discontinuities and being solid in configuration. The lens functions to columnate a signal during its outward passage and to focus the signal on its return passage so as to form an extremely narrow beam of energy; and for causing phase cancellation of the high amplitude signals reflected back from the plano surface of the lens. U.S. Pat. No. 4,765,705 describes a grading surface plasmocoupler having three layers of dielectric material such that the first layer is of a negative dielectric, the second layer is of a positive dielectric, and the third layer is of a positive dielectric. U.S. Pat. No. 3,818,33 describes a microwave window and antenna apparatus including microwave windows having flat inner end portions which extend parallel to each other and perpendicular to the microwave beam axis.

In all of the applications described, the measurement of the height or level of a material contained in a tank or vessel is tampered by the atmosphere inside the tank. The atmosphere in the tank is such that large amounts of condensed water or liquid can accumulate on the roof and walls of the vessel or tank. Also, large amounts of condensed water or liquid accumulate over the surface of the dielectric window mounted in the tank, for example, in the roof of the tank. Water has a very high dielectric constant and is easily made conductive by dissolved ions. Thus, relatively small amounts of water on a dielectric window can make the window virtually opaque to microwaves. None of the above-discussed references solve, and in most cases their not even discussed, the problem of water accumulating on a dielectric window.

The disadvantages of the prior art are overcome by the present invention, and improved methods and apparatus are hereinafter described for inexpensively yet reliably transmitting microwaves into a tank or other vessel without being inhibited by water or moisture build-up on the dielectric process seal.

It is, therefore, a feature of the present invention to provide a process seal which in normal use provides the most efficient transmission of microwave energy. A feature of the present invention is to provide a process seal which optimizes the foreign build-up of material on the seal.

Another feature of the present invention is to provide a process seal which is not effected by the build-up of condensation on the seal.

Another feature of the present invention is to provide a process seal which is sufficiently strong to withstand the pressures typically associated with such seals.

Yet another feature of the invention is to provide a method of sealing a tank which method is robust to the presence of foreign build-up, condensation and pressure.

Still another feature of the present invention is controlling or manipulating the dielectric of the material associated with the process seal for optimizing the effects of foreign build-up, condensation and pressure.

Another feature of the present invention is to provide a process seal which controls or manipulates the geometric shape of the seal for optimizing the characteristics of foreign build-up, condensation or pressure associated with the seal.

Yet another feature of the present invention is to provide a process seal which controls or manipulates the polarization of the associated microwaves for optimizing the characteristics of foreign build-up condensation and pressure associated with the seal.

Yet another feature of the present invention is to provide a process seal which controls or manipulates the thickness of the seal for optimizing the characteristics of the seal associated with foreign build-up, condensation and pressure.

SUMMARY OF THE INVENTION

Process seals for microwave sensors must perform at least two important functions. First, a microwave process seal must allow the microwave energy to pass with a minimum amount of reflection and a minimum amount of attenuation. Second, the microwave process seal must withstand the temperature, pressure and chemical attack of the process material.

A process seal that fits in the mouth of a microwave device is provided. The microwave process seal is kept as thin as possible to meet pressure requirements. The process seal of the present invention eliminates the problem of small amounts of water rendering the dielectric window virtually opaque to microwaves. The apparatus of the present invention modifies the bottom surface of a standard planar dielectric window by the introduction of a series of parallel grooves. Preferably, the parallel grooves are at or near the Brewster angle. The beneficial action of the grooves is two fold. First, the grooves help to prevent the accumulation of large amounts of water on the inner surface of the process seal. The grooves provide an inclined surface. The inclined surface of the groove permits gravity to pull the water off the relatively sharp points of the raised dielectric material between the grooves. Second, the grooves cause the water that does remain on the surface to be aligned in a regular patter of parallel lines. In the process seal of the present invention, the associated microwave source is provided to be linearly polarized. Also, the plane of polarization of the microwave source is rotated such that the electric field vector of the propagating wave is perpendicular to the grooves in the process seal. Thus, the microwave energy will align with the grooves and will pass through the process seal with relatively little attenuation.

The Brewster angle is that angle for which there is total transmission across a dielectric boundary for energy that strikes the boundary with a linear polarization. The Brewster angle provides that the electric field lies int he plane formed by the polarization vector k and the normal to the surface n. From classical theory, the Brewster angle is given by $$\Theta_b = \tan^{-1}\left(\sqrt{\frac{E_2}{E_1}}\right)$$

where
$\Theta_b$ = Brewster's angle (angle of incidence),
$E_2$ = dielectric constant of the 2nd medium,
$E_1$ = dielectric constant of the 1st medium.

The thickness of the process seal depends upon the dielectric constant of the lens material and, of course, the required mechanical strength of the process seal. Preferably, the thickness of the process seal is chose such that the effective electrical strength of the signal path through the lens is an intrical multiple of a half wave length. However, it should be fully appreciated that the thickness of the process seal being an intrical multiple of a half wave length is not necessary for the beneficial effects of the grooves to be obtained. Choosing an integral half wave length for the thickness of the process seal minimizes the reflections from the surface of the seal.

A related aspect of using the present invention in the design of process seals is to increase the strength of the process seal to withstand high pressures. Since a conductive grading can be rendered essentially transparent to microwave energy by proper orientation of the polarization of the electric field vector, the present invention also teaches the introduction of a support structure within the dielectric window or against one side of the process seal for strengthening the seal. For example, the reinforcing structure an be metal and designed to increase the strength of the process seal while permitting the microwave energy to pass unhindered.

The present invention is adaptable for use with different materials. The Brewster angle differs with different material. Also, a range of angles about the Brewster angle are effective in practicing the present invention. Thus, the range of acceptable angles for use in practicing the present invention is dependent on the dielectric constant of the material.

These and other features and advantages of the present invention will become apparent from the detailed description, wherein reference is made to the figures in the accompanying drawings.

BRIEF DESCRIPTION OF THE DRAWINGS

The accompanying drawings which are incorporated in and constitute a part of the specification, illustrate a preferred embodiment of the invention and together with the general description of the invention given above and the detailed description of the preferred embodiment given below, serve to explain the principles of the invention.

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF PREFERRED EMBODIMENTS

Reference will now be made in detail to the present preferred embodiments of the invention as described in the accompanying drawings.

Process seals for microwave sensors must perform at least two important functions. First, a microwave process seal must allow the microwave energy to pass with a minimum amount of reflection and a minimum amount of attenuation. Second, the microwave process seal must withstand the temperature, pressure and chemical attack of the process material. Passing the maximum microwave energy through the process seal is easily accomplished in the absence of condensation or coating build up on the process side of the seal. The real problem is to provide a microwave window that minimizes reflection and transmission losses when one surface of the seal is coated with a process material, or when condensation of water occurs on the surface, or when both situations occur.

Figure 1:
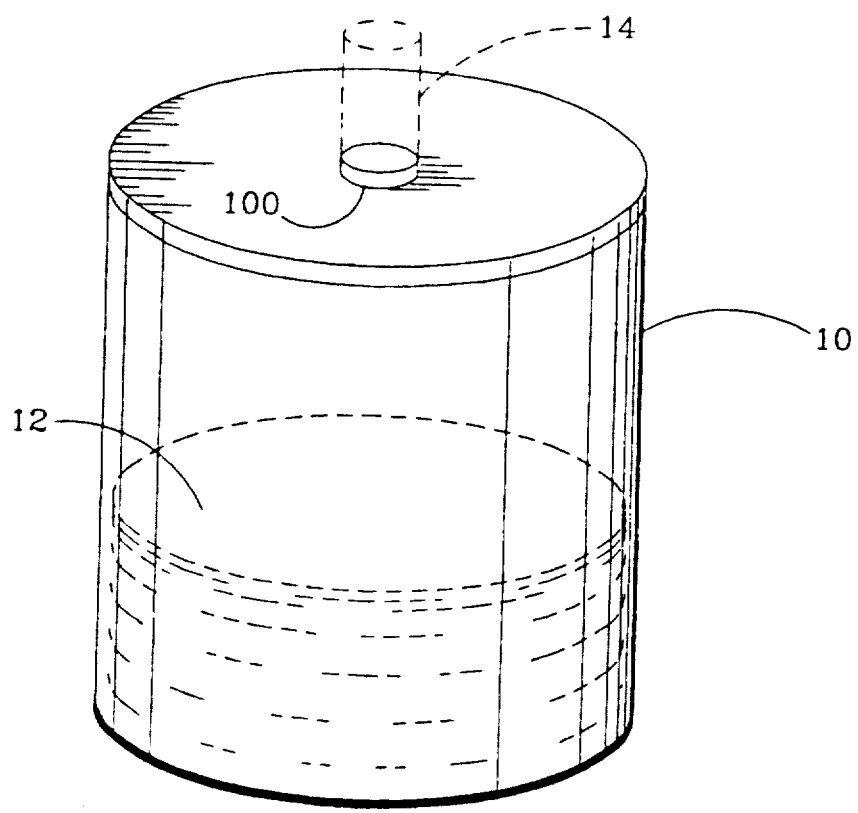
FIG. 1 is a pictorial illustration of microwave level detector including the process seal of the present invention.

FIG. 1 illustrates an apparatus associated with the process seal of the present invention. The process seal 100 is affixed to the top of the tank 10. The tank 10 contains the fluid 12. The microwave device 14 affixed to the process seal 100 is used to make measurements of the fluid 12 in the tank 10.

Figure 2:
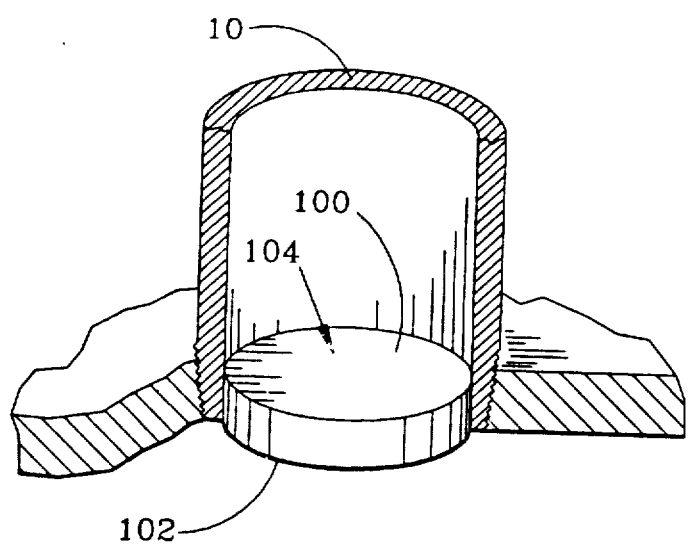
FIG. 2 is a sectional, cut-away view illustrating the process seal generally reference in FIG. 1.

FIG. 2 is a sectional, cross-section view of the process seal 100 illustrated in FIG. 1. The process seal 100 is placed in an aperture in the tank 10. The outer surface 104 of the process seal 100 is illustrated facing upward. Not illustrated in the inner surface 102 of the process seal 100.

Figure 3:
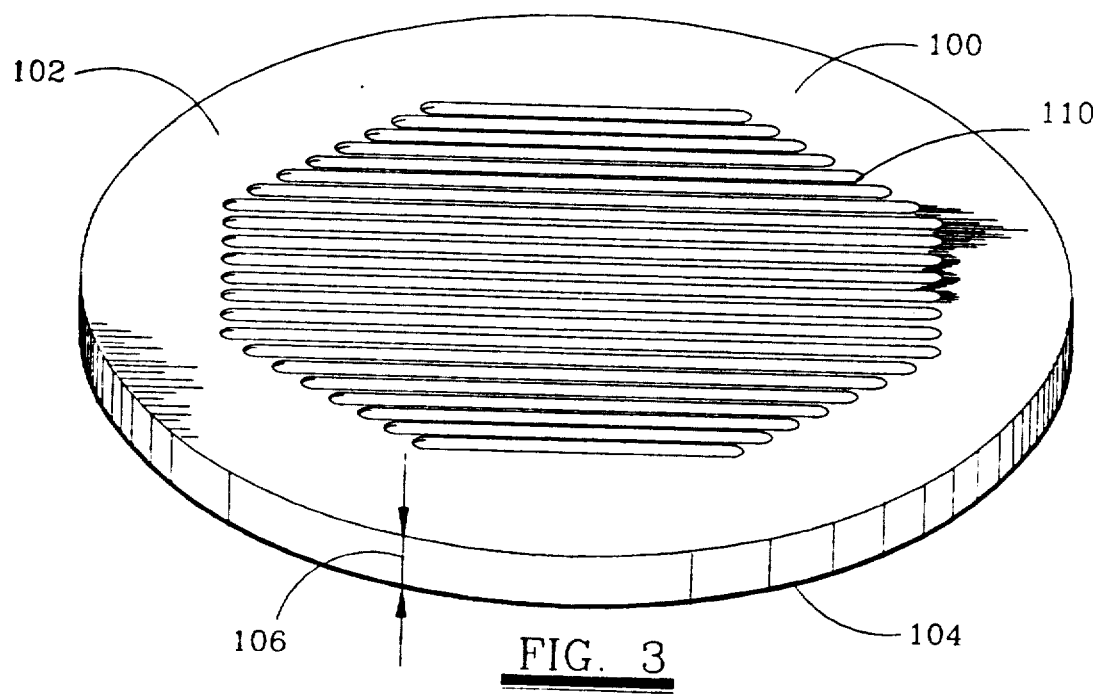
FIG. 3 is a illustration of a process seal practicing the present invention.

FIG. 3 is a perspective view of one embodiment of the process seal 100 of the present invention. The inner grooves 110 are illustrated in a sexhagional shape on the inner surface 102. The outer surface 104 is not illustrated. The process seal 100, as illustrated in FIG. 3, has a thickness 106.

Figure 4:
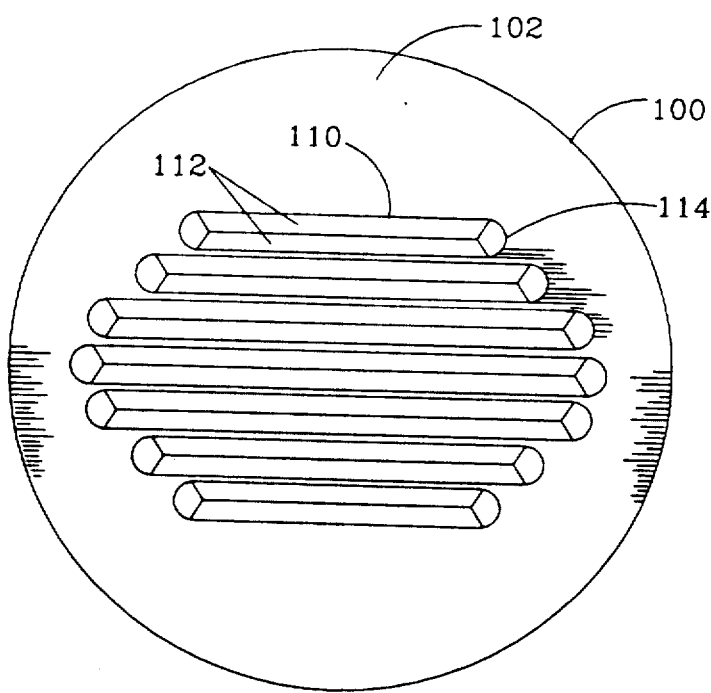
FIG. 4 is a lower, plane view of a process seal illustrating grooves with angled sides.

FIG. 4 is a preferred embodiment of the present invention as illustrated in FIG. 3. The process seal 100 is illustrated having inner grooves 110 on the inner surface 102. The inner grooves 110 have angled sides 112. Also, the inner grooves 110 have rounded end portions 114. The inner grooves 110 are arranged in a juxtaposed orientation such that the longitudinal axis of each inner groove is parallel to all the other inner grooves. It can be appreciated by one skilled int he art that other geometric configurations are equally as effective in implementing the features of the present invention as previously described.

Figure 5:
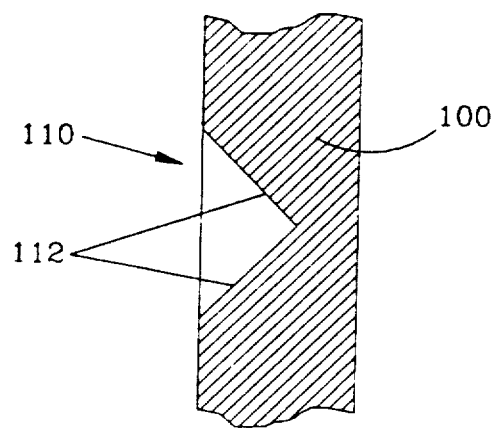
FIG. 5 is a sectional, cross-section view illustrating the angled sides of the grooves illustrated in the process seal of the present invention as referenced in FIG. 4.

FIG. 5 is a sectional, cross-sectional view of the inner grooves 110 illustrated in FIG. 4. A sectional portion of the process seal 100 is illustrated. The angles sides 112 of the inner groove are illustrated such that the conical configuration is illustrated.

Figure 6:
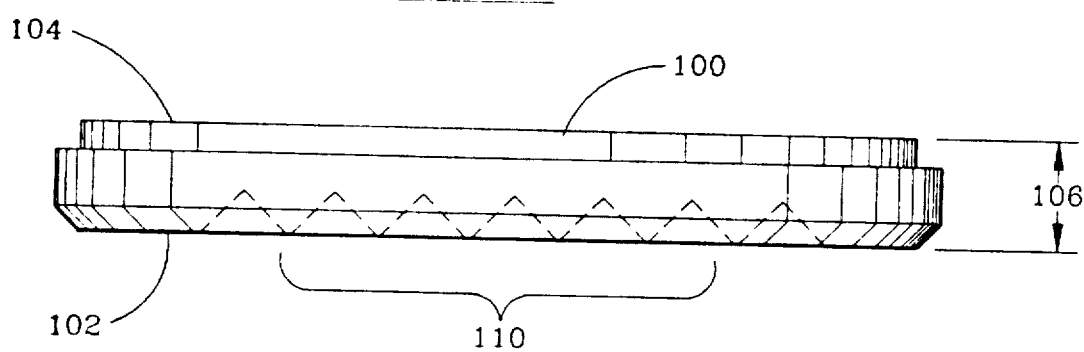
FIG. 6 is a cross-sectional illustration of the process seal practicing the present invention as generally referenced in FIG. 4.

FIG. 6 is an illustration of a cross-section of the process seal 100 of the present invention as illustrated in FIG. 4. The inner grooves 110 are illustrated in the inner surface 102. The outer surface 104 is configured without any grooves. The thickness 106 of the process seal 100 is determined by the pressure exposed to the seal and the effective electrical length of the signal path through the process seal 100 such that it is an integral multiple of a half wave length. It is appreciated by one skilled in the art that although the thickness 106 is better determined when considering the effective electrical length, such consideration is not necessary for the beneficial effects of the grooves in dispersing or disengaging condensation.

Figure 7:
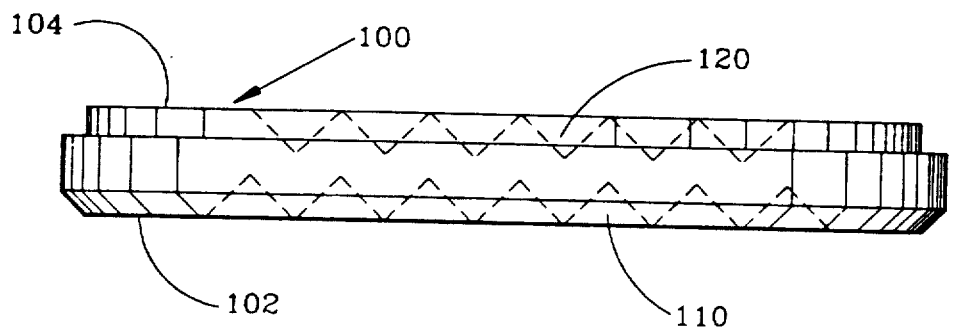
FIG. 7 is another embodiment of the process seal of the present invention illustrating grooves on the outer surface and the inner surface of the process seal as generally referenced in FIG. 4.

FIG. 7 is yet another embodiment of the process seal 100 of the present invention. In FIG. 7, inner grooves 110 are illustrated in the inner surface 102. Also, a plurality of outer grooves 120 is illustrated in the outer surface 104. Although the outer grooves 120 and the inner grooves 110 are illustrated in an aligned orientation, it should be appreciated that the orientation could be apex-2-apex rather than apex-2-valley as illustrated in FIG. 7. Also, it should be appreciated that grooves of differing angle may still be used in practicing the present invention. A subsequent discussion of the range of angles appropriate will follow.

Figure 8:
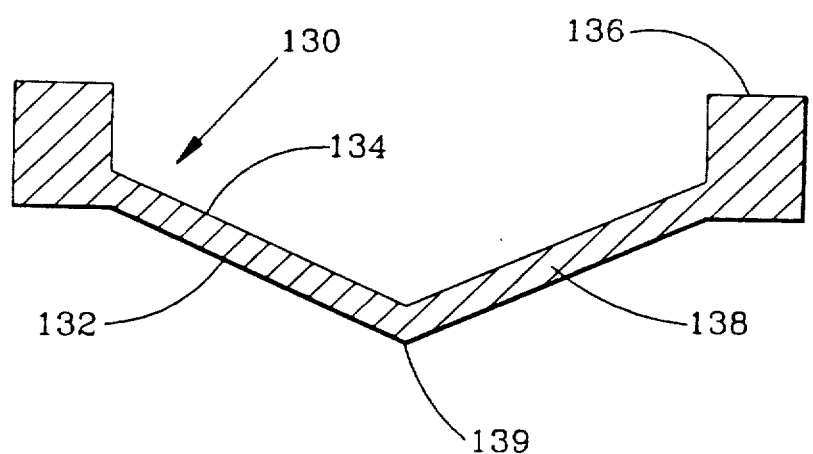
FIG. 8 is yet another embodiment of the present invention illustrating a conical process seal practicing the present invention.

FIG. 8 illustrates yet still another embodiment of a process seal 130 practicing the present invention. The process seal 130 is of conical shape. The inner surface 132 includes a conical structure 138 meeting at an apex 139. Also, a cylindrical support structure 136 is provided for engaging the tank or vessel (not illustrated). The outer surface 134 provides a conical configuration similar, but reciprocal of, to the inner surface 132. It can be appreciated that the angle associated with the conical structure 138 is determined based upon the Brewster angle.

The microwave process seal is kept as thin as possible to meet pressure requirements. Grooves in the seal are oriented at or near the Brewster angle. The Brewster angle is that angle for which there is total transmission across a dielectric boundary for energy that strikes the boundary with a linear polarization. The Brewster angle provides that the electric field lies in the plane formed by the polarization vector k and the normal to the surface n. From classical theory, the Brewster angle is given by $$\Theta_b = \tan^{-1}\left(\sqrt{\frac{E_2}{E_1}}\right)$$

where
- $\Theta_b$ = Brewster's angle (angle of incidence).
- $E_2$ = dielectric constant of the 2nd medium.
- $E_1$ = dielectric constant of the 1st medium.

The present invention uses a point where the directions of reflection and transmission are 90° apart. There is no reflection at all of energy with its electric vibration in the plane of incidence. However, energy vibrating in other directions will still be reflected. This effect occurs at "Brewster's angle," $\Theta_b$(theta). Brewster's angle is the angle of incidence such that $$\tan\Theta_b = n = \sqrt{E}$$

The physical reason for the loss of the reflected component can be conjectured. It is thought that dipoles near the surface are excited into isolation by the refracted wave. The dipoles isolate parallel to the direction where there should be a reflected wave. However, radiation from dipoles is zero in that direction and a maximum in the perpendicular direction, i.e., along the refracted wave.

Nonetheless, it may not be practical to make the seal angle exactly equal to Brewster's angle because $\Theta_b$ will always be greater than 45°. Also, an angle less than 45° may offer improved performance over a non-angled seal because the effect that causes the "Brewster" behavior is a relatively smooth function of angles. Further, the thickness of the microwave process seal of the present invention is not an issue as is a flat seal whose thickness must be a function of a half wavelength for minimum reflections.

Calculating the Brewster's angle for the typical dielectrics results in fairly large values. For instance, suppose the process seal is made from TFE which has a dielectric constant of approximately 2.5. The resulting Brewster's angle is 57.7°. However, of more importance is the angle for least reflection when the surface becomes coated with water. Suppose enough water is on the surface so that the effective dielectric constant is 1.5. When the energy travels from the teflon to the water coated surface, the Brewster angle should be 37.7° inside the TFE. The angles outside the TFE would be the complement of the inner angle, or 52.24°.

Figure 9:
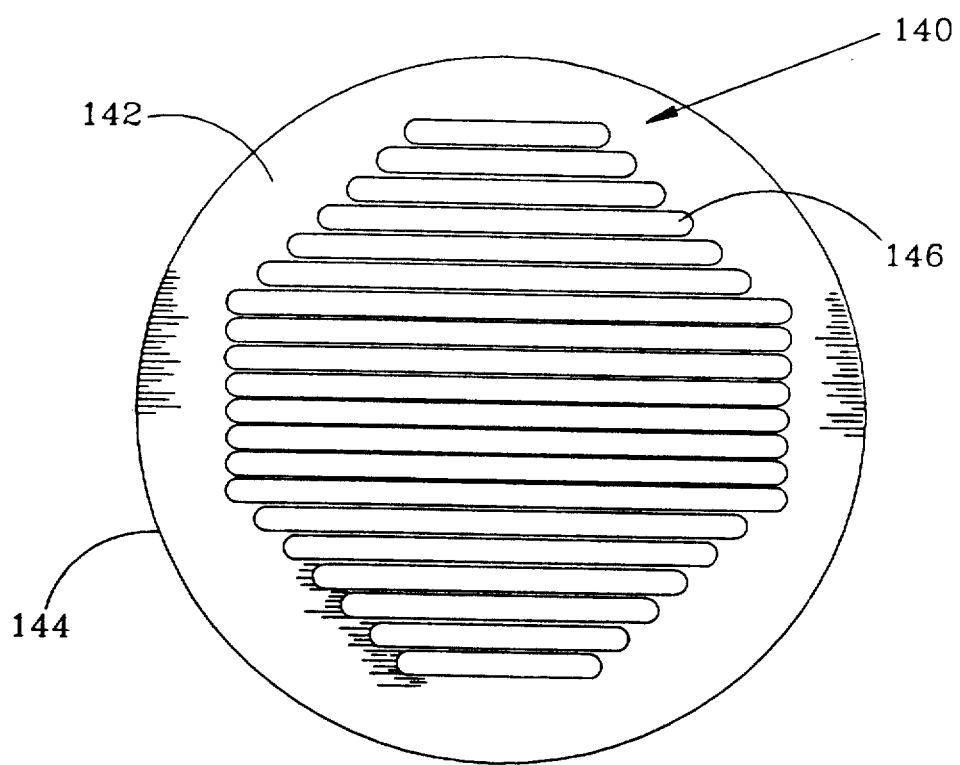
FIG. 9 is another embodiment of the process seal of the present invention illustrating the use of range of Brewster angles.

FIG. 9 illustrates a general embodiment utilizing an integral approach to utilizing the Brewster angle with the process seal 140 of the present invention. The grooves 146 are, again, in the inner surface 142. The grooves 146 can be of such an arch that the primary tangent to the arch is within the acceptable range associated with the Brewster angle. Further, the arch is associated with the maximum drainage of condensation.

Although the invention has been described in terms of the specified embodiments which are set forth in detail, it should be understood that this is by illustration only and that the invention is not necessary limited thereto, since alternative embodiments and operating techniques will become apparent to those skilled in the art in view of the disclosure. Accordingly, modifications are contemplated which can be made without departing from the spirit of the described invention.

What is claimed is:

1. A process seal for reducing the reflection and attenuation of energy passing therethrough in association with a process material in a container comprising:
    (a) a member for passing energy therethrough; and
    (b) a configuration in operative association with said member and having a geometrical shape orientated at an angle equal to the arctangent of the square root of the dividend of the dielectric constant of the material by the dielectric constant of the process seal for providing total transmission across the process seal for energy impinging the process seal with a linear polarization such that the electric field of the energy lies in the plane formed by the propagation vector and the vector normal to the surface of the process seal.

2. A method for reducing the reflection and attenuation of energy passing through a process seal in association with a process material in a container and a device for generating and measuring the energy, comprising the steps of:
    (a) engaging with the container a member for passing energy therethrough which seals process medium from the device for generating and measuring the energy;
    (b) configuring the member with geometrical shapes orientated at an angle such that the angle of incidence of the measurement energy is equal to the angle of reflection of the measurement energy and the geometrical shapes are at angles equal to the arctangent of the square root of the dividend of the dielectric constant of the material by the dielectric constant of the process seal;
    (c) generating energy which is linearly polarized;
    (d) engaging the energy with the number for aligning the polarized energy with the geometrical shapes for transparently passing the energy through the member without reflection and attenuation.

3. The process seal as defined in claim 1, wherein said configuration comprises a geometrical shape orientated to align any foreign build-up and condensation for reducing the reflection and attenuation of energy passing therebetween.

4. The process seal as define din claim 2, wherein the step of configuring the member with one or more geometrical shapes orientated at an angle comprises orientating the geometrical shapes at angles for which there is total transmission across the process seal for energy impinging the geometrical shapes with a linear polarization such that the electric field lies in the plane formed by the propagation vector and the normal vector.

* * * * *